US012681375B2

(12) United States Patent (10) Patent No.: US 12,681,375 B2

Nakamura (45) Date of Patent: Jul. 14, 2026

(54) PROJECTION DEVICE

(71) Applicant: SEIKO EPSON CORPORATION, Tokyo (JP)

(72) Inventor: Taku Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 573 days.

(21) Appl. No.: 18/185,363

(22) Filed: Mar. 16, 2023

(65) Prior Publication Data

US 2023/0296975 A1 Sep. 21, 2023

(30) Foreign Application Priority Data

Mar. 18, 2022 (JP) ................................. 2022-043560

(51) Int. Cl.
G03B 21/20 (2006.01)
G09G 3/00 (2006.01)

(52) U.S. Cl.
CPC ..... G03B 21/2066 (2013.01); G03B 21/2033 (2013.01); G09G 3/001 (2013.01); G09G 2330/02 (2013.01)

(58) Field of Classification Search
CPC ........... G03B 32/2066; G03B 32/2033; G09G 3/001; G09G 2330/02
USPC ....................................................... 353/122
See application file for complete search history.

(56) References Cited

U.S. PATENT DOCUMENTS

| | | | |
|---|---|---|---|
| 5,673,127 A | 9/1997 | Takahara et al. | |
| 5,875,008 A | 2/1999 | Takahara et al. | |
| 6,049,364 A | 4/2000 | Takahara et al. | |
| 6,218,679 B1 | 4/2001 | Takahara et al. | |
| 8,116,005 B2 * | 2/2012 | Huibers ............... | G02B 27/148 |
| | | | 359/618 |
| 2003/0202159 A1 | 10/2003 | Cobb et al. | |
| 2005/0146652 A1 | 7/2005 | Yokoyama et al. | |
| 2005/0146689 A1 | 7/2005 | Iechika et al. | |
| 2006/0007401 A1 * | 1/2006 | Ho ......................... | G03B 33/12 |
| | | | 353/31 |
| 2017/0242161 A1 | 8/2017 | Zhang et al. | |
| 2019/0302468 A1 | 10/2019 | Koshihara | |
| 2021/0159373 A1 * | 5/2021 | Grundmann ............ | H01L 24/80 |

(Continued)

FOREIGN PATENT DOCUMENTS

| | | |
|---|---|---|
| JP | H11095185 | 4/1999 |
| JP | 2002162614 | 6/2002 |

(Continued)

*Primary Examiner* — Jerry L Brooks

(74) *Attorney, Agent, or Firm* — JCIPRNET

(57) ABSTRACT

A projection device includes a first dichroic mirror configured to transmit light of a first wavelength and reflect light of a second wavelength, a second dichroic mirror configured to transmit the light of the first wavelength and reflect light of a third wavelength, a first self-luminous display device configured to use the light of the first wavelength to emit first image light, a second self-luminous display device configured to use the light of the second wavelength to emit second image light, a third self-luminous display device including a plurality of third light-emitting elements configured to emit the light of the third wavelength, and a projection optical system configured to project, onto a projection target, image light obtained by being combined by the first dichroic mirror and the second dichroic mirror.

7 Claims, 18 Drawing Sheets

(56)                References Cited

U.S. PATENT DOCUMENTS

2021/0311310  A1 *  10/2021  Trisnadi .............. G02B 6/0073
2024/0345335  A1 *  10/2024  Xu ........................ H10H 20/84

FOREIGN PATENT DOCUMENTS

JP          2003057746        2/2003
JP          2003322910       11/2003
JP          2019174515       10/2019
JP          2022024294        2/2022
WO          2004012007        2/2004

* cited by examiner

S

L

1C

3

L

2

40

50

13 63

12

62

15

LR

LB

15

67R

67B

66R

66B

LG

52

41a

51

51a

42

41

14

65

65

14

15 67G 66G

61

65

11

14

8

6

4

5

7

X2

X

Y

Y1

Y2

Z

X1

PROJECTION DEVICE

The present application is based on, and claims priority from JP Application Serial Number 2022-043560, filed Mar. 18, 2022, the disclosure of which is hereby incorporated by reference herein in its entirety.

BACKGROUND

1. Technical Field

The present disclosure relates to a projection device.

2. Related Art

JP-A-2019-174515 discloses a display device that combines light beams emitted from three organic electroluminescence panels using a dichroic prism, and projects the resultant light onto a screen using a projection optical system. Each of the organic electroluminescence panels is a light emitting panel provided with an organic electroluminescence element, and thus is a self-luminous display device. It is indicated that the dichroic prism has a rectangular parallelepiped shape including a first incidence surface, a second incidence surface, a third incidence surface, and an emission surface, and further includes a top surface and a bottom surface in addition to these side surfaces. The three self-luminous display devices are a first self-luminous display device facing the first incidence surface which is the back surface of the dichroic prism, a second self-luminous display device facing the second incidence surface which is one side surface of the dichroic prism, and a third self-luminous display device facing the third incidence surface which is the other side surface of the dichroic prism. The light beams emitted from the respective self-luminous display devices pass through the dichroic prism to be superimposed, and the resultant light is emitted from the emission surface that is the front surface of the dichroic prism.

US 2017/0242161 A1 discloses a display panel that includes pixel light sources arranged while being aligned and has a divergence angle that is reduced by a microlens, but is still considerably large.

The light emitted from each of the self-luminous display devices is diffused while passing through the dichroic prism. Thus, part of the light is reflected by the top surface, the bottom surface, or the side surface before reaching the emission surface of the dichroic prism. Such light is emitted from the emission surface of the dichroic prism to be stray light.

SUMMARY

A projection device of the present disclosure to solve the problem described above includes a first dichroic mirror configured to transmit light of a first wavelength and reflect light of a second wavelength, a second dichroic mirror configured to transmit the light of the first wavelength and reflect light of a third wavelength, a first self-luminous display device including a plurality of first light-emitting elements configured to emit the light of the first wavelength, the first self-luminous display device being configured to use the light of the first wavelength to emit first image light toward the first dichroic mirror and the second dichroic mirror, a second self-luminous display device including a plurality of second light-emitting elements configured to emit the light of the second wavelength, the second self-luminous display device being configured to use the light of the second wavelength to emit second image light toward the first dichroic mirror, a third self-luminous display device including a plurality of third light-emitting elements configured to emit the light of the third wavelength, the third self-luminous display device being configured to use the light of the third wavelength to emit third image light toward the second dichroic mirror, a projection optical system configured to project, onto a projection target, image light obtained by being combined by the first dichroic mirror and the second dichroic mirror, a control unit configured to control the first self-luminous display device, the second self-luminous display device, and the third self-luminous display device, and a power source unit configured to supply power to the first self-luminous display device, the second self-luminous display device, and the third self-luminous display device.

DESCRIPTION OF EXEMPLARY EMBODIMENTS

A projection device according to an embodiment of the present disclosure will be described below with reference to the drawings.

First Embodiment

Figure 1:
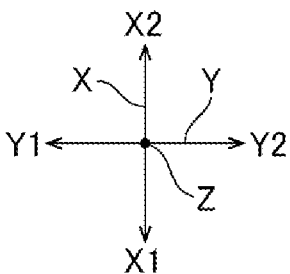
FIG. 1 is a schematic view of an image forming unit according to a first embodiment.

FIG. 1 is a schematic view illustrating a main part of a projection device according to a first embodiment. As illustrated in FIG. 1, a projection device 1A includes an image forming unit 2 that emits image light L, a control unit 4 that controls the image forming unit 2, a projection optical system 3 that enlarges the image light L and projects the resultant light on a screen S that is a projection target to form an image, and a power source unit 5. These components are contained or installed in a casing 8. A battery or the like can be used as the power source unit 5. The image forming unit 2 does not require a separate light source and can be separated from other components. With such configurations, a projection system can be obtained featuring high luminance, small size, and light weight, while enabling a high quality image to be viewed.

The image forming unit 2 includes a first self-luminous display device 11, a second self-luminous display device 12, and a third self-luminous display device 13. In this example, each of the self-luminous display devices is a display panel having a light-emitting element for each pixel. The light-emitting element is an organic light-emitting diode (OLED). Each of the self-luminous display devices may also be a p-LED. The self-luminous display devices are the same member. The image forming unit 2 includes a first dichroic mirror 40 and a second dichroic mirror 50 that combine first image light LG of a first wavelength emitted from the first self-luminous display device 11, second image light LB of a second wavelength emitted from the second self-luminous display device 12, and third image light LR of a third wavelength emitted from the third self-luminous display device 13.

The control unit 4 includes an image processing unit 6 to which an image signal such as a video signal is input, and a display drive unit 7 that drivingly controls the first self-luminous display device 11, the second self-luminous display device 12, and the third self-luminous display device 13 based on an image signal output from the image processing unit 6. The image processing unit 6 converts the input image signal into an image signal including the tone of each color and the like. The display drive unit 7 operates the first self-luminous display device 11, the second self-luminous display device 12, and the third self-luminous display device 13 based on the image signals of the respective colors output from the image processing unit 6. When the first image light LG, the second image light LB, and the third image light LR are combined by the first dichroic mirror 40 and the second dichroic mirror 50, the image light L corresponding to the image signal is formed. In the present example, the first image light LG is green. The second image light LB is blue. The third image light LR is red. The first self-luminous display device 11, the second self-luminous display device 12, and the third self-luminous display device 13 emit image light of green, blue, and red respectively.

The first dichroic mirror 40 and the second dichroic mirror 50 are disposed to cross each other. The first dichroic mirror 40 and the second dichroic mirror 50 cross each other at a right angle. The self-luminous display devices surround the first dichroic mirror 40 and the second dichroic mirror 50 from three directions. The projection optical system 3 is located on the side opposite to the first self-luminous display device 11 with the first dichroic mirror 40 and the second dichroic mirror 50 interposed therebetween.

In the following description, three directions orthogonal to each other are referred to as an X-axis direction, a Y-axis direction, and a Z-axis direction, respectively. FIG. 1 illustrates the image forming unit 2 as viewed in the Z-axis direction. The X-axis direction is a direction in which the first self-luminous display device 11, the first dichroic mirror 40, the second dichroic mirror 50, and the projection optical system 3 are arranged. The Y-direction is a direction in which the second self-luminous display device 12, the first dichroic mirror 40, the second dichroic mirror 50, and the third self-luminous display device 13 are arranged. In the X-axis direction, the sides on which the first self-luminous display device 11 and the projection optical system 3 are respectively positioned with respect to the first dichroic mirror 40 and the second dichroic mirror 50 are defined as an X1 direction and an X2 direction. In the Y-axis direction, the sides on which the second self-luminous display device 12 and the third self-luminous display device 13 are respectively positioned with respect to the first dichroic mirror 40 and the second dichroic mirror 50 are defined as a Y2 direction and a Y1 direction. The first dichroic mirror 40 is inclined from the X1 direction toward the Y2 direction. The second dichroic mirror 50 is inclined from the X1 direction toward the Y1 direction.

Figure 2:
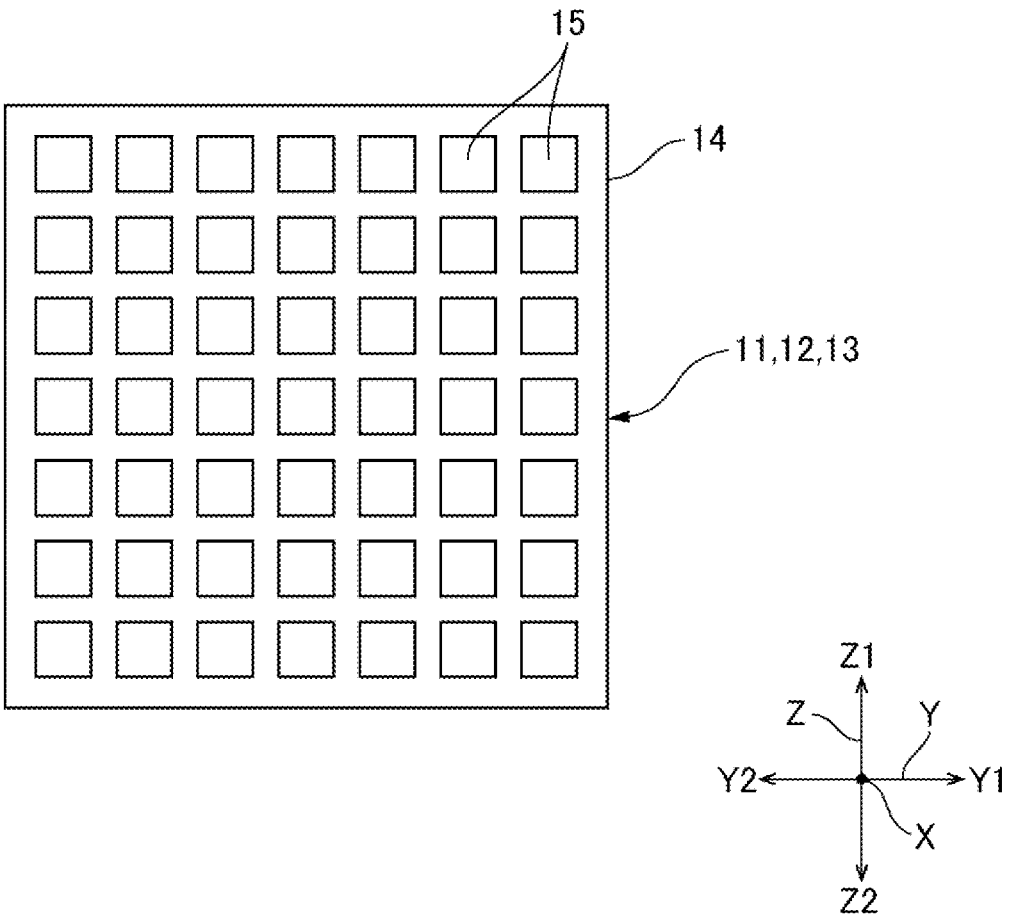
FIG. 2 is a schematic front view of a self-luminous display device.
Figure 3:
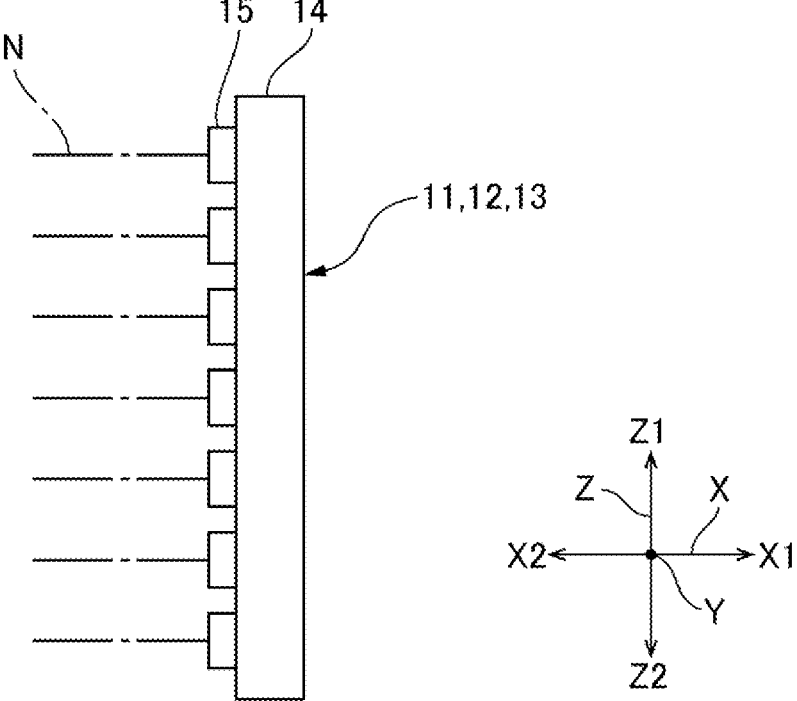
FIG. 3 is a schematic side view of the self-luminous display device.

The first self-luminous display device 11 emits the first image light LG toward the first dichroic mirror 40 and the second dichroic mirror 50 along the X2 direction. The second self-luminous display device 12 emits the second image light LB toward the first dichroic mirror 40 and the second dichroic mirror 50 along the Y1 direction. The third self-luminous display device 13 emits the third image light LR toward the first dichroic mirror 40 and the second dichroic mirror 50 along the Y2 direction. FIG. 2 is a schematic front view of a light-emitting display surface of the first self-luminous display device 11 as viewed in the X1 direction. FIG. 3 is a schematic side view of the side surface of the first self-luminous display device 11 as viewed in the Y2 direction. As illustrated in FIGS. 2 and 3, the first self-luminous display device 11 includes a substrate 14 and a plurality of light-emitting elements 15 arranged in a matrix on the substrate 14. An optical axis N of each of the light-emitting elements 15 is perpendicular to the substrate 14. In other words, the optical axes N of the respective light-emitting elements 15 are parallel to each other. Each of the light-emitting element 15 emits image light. The second self-luminous display device 12 and the third self-luminous display device 13 have the same configuration.

As illustrated in FIG. 1, the first dichroic mirror 40 includes a glass plate 41 and a first dichroic film 42 provided on a first surface 41a of the glass plate 41 facing the X2 direction. The first image light LG and the third image light LR transmit through the first dichroic mirror 40. The first dichroic mirror 40 reflects the second image light LB in the X2 direction.

The second dichroic mirror 50 includes a glass plate 51 and a second dichroic film 52 provided on a first surface 51a of the glass plate 51 facing the X2 direction. The first image light LG and the second image light LB transmit through the second dichroic mirror 50. The second dichroic mirror 50 reflects the third image light LR in the X2 direction.

The first image light LG from the first self-luminous display device 11 and the second image light LB from the second self-luminous display device 12 are combined by the first dichroic mirror 40 and the resultant light travels in the X2 direction. The first image light LG from the first self-luminous display device 11 and the third image light LR from the third self-luminous display device 13 are combined by the second dichroic mirror 50 and the resultant light travels in the X2 direction. The light beams as a result of the combination in the first dichroic mirror 40 and the second dichroic mirror 50 are superimposed to be the image light L toward the X2 direction. The image light L is incident on the projection optical system 3.

According to the present embodiment, the respective image light beams emitted from the first self-luminous display device 11, the second self-luminous display device 12, and the third self-luminous display device 13 are superimposed by the first dichroic mirror 40 and the second dichroic mirror 50 and then the resultant image is incident on the projection optical system 3. No dichroic prism is used for superimposing the respective image light beams emitted from the three self-luminous display devices. Thus, production of stray light due to reflection in the prism can be prevented.

In the present embodiment, the first dichroic mirror 40 and the second dichroic mirror 50 cross each other at a right angle. Thus, the first dichroic mirror 40 and the second dichroic mirror 50 can be installed in a small space.

The display panel is a self-luminous display device that can emit light with high luminance requiring no light source or large power source that supplies power to the light source, whereby the projection device 1A as a whole can have a small size and light weight.

Figure 4:
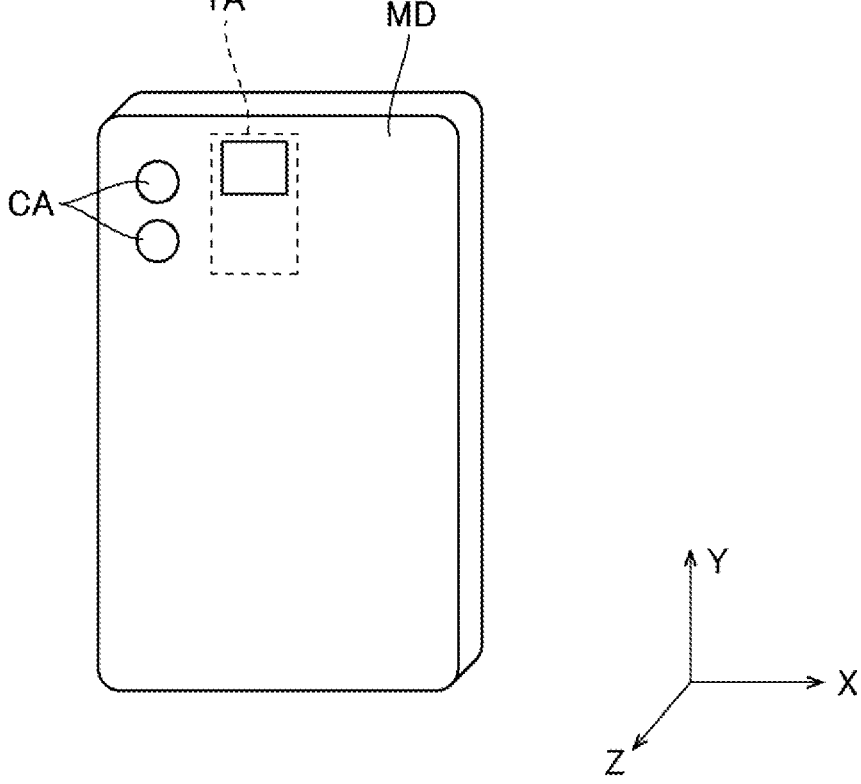
FIG. 4 is a schematic view illustrating an example of a projection system including a projection device.

FIG. 4 illustrates an example of a possible mode in which the projection device 1A is incorporated in a thin mobile device MD such as a smartphone including various devices such as a camera CA, to perform image projection.

Figure 5:
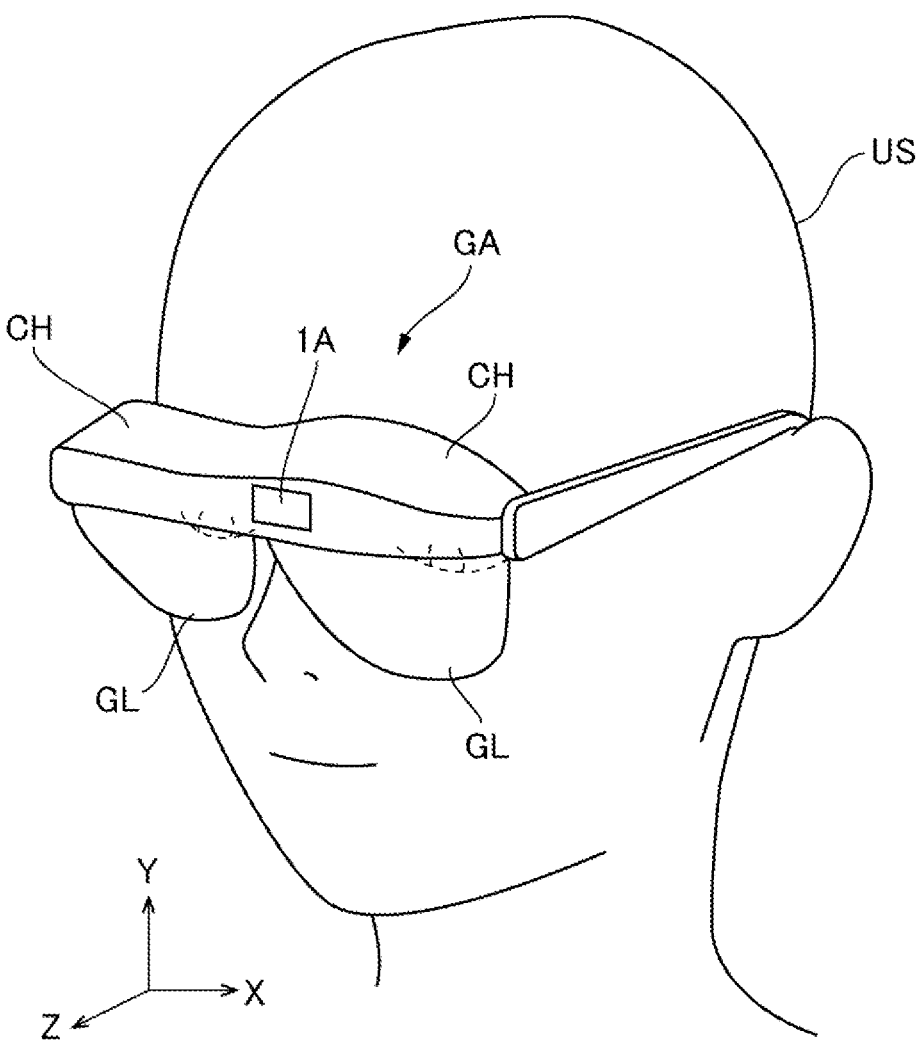
FIG. 5 is a schematic view illustrating another example of the projection system including the projection device.

FIG. 5 illustrates another example of a possible mode in which the projection device 1A can be easily installed in glasses GA worn by an observer or wearer US, to project an image onto a real space ahead of the line of sight of the observer or wearer US. Furthermore, with a switching mechanism CH further provided to enable projection of the image from the projection device 1A onto a spectacle lens GL of the glasses GA, the glasses GA can be configured as a head up display.

Figure 6:
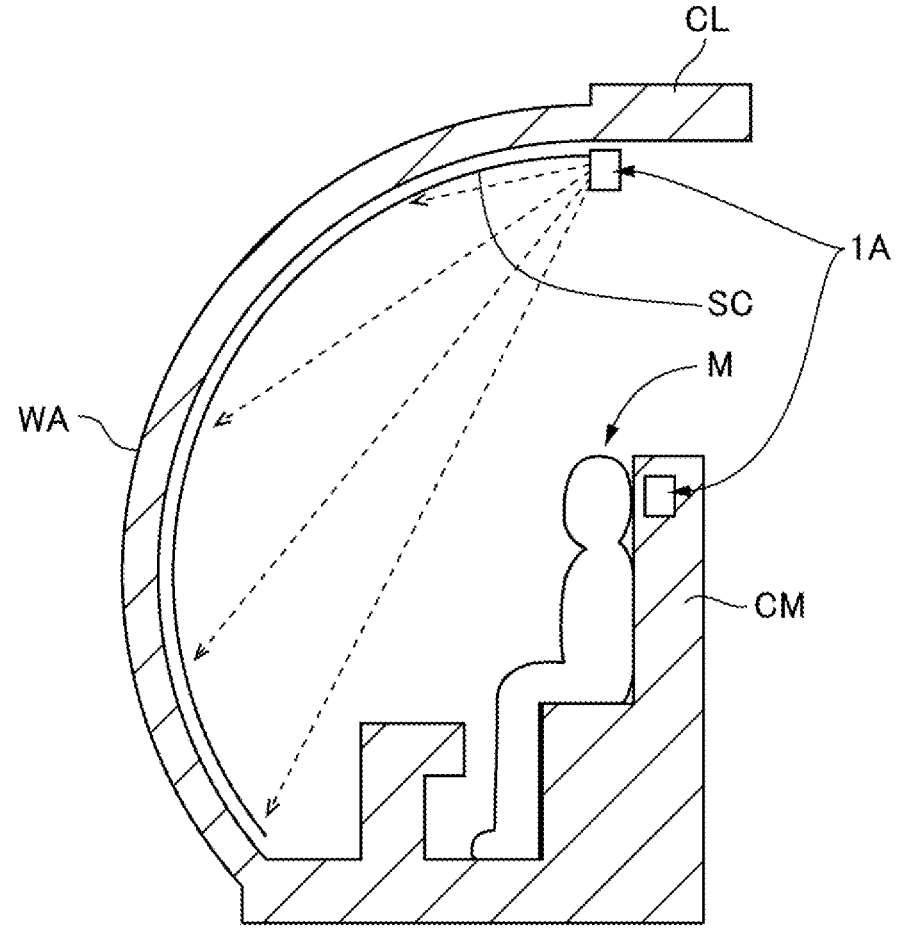
FIG. 6 is a schematic vertical cross-sectional view illustrating still another example of the projection system including the projection device.
Figure 7:
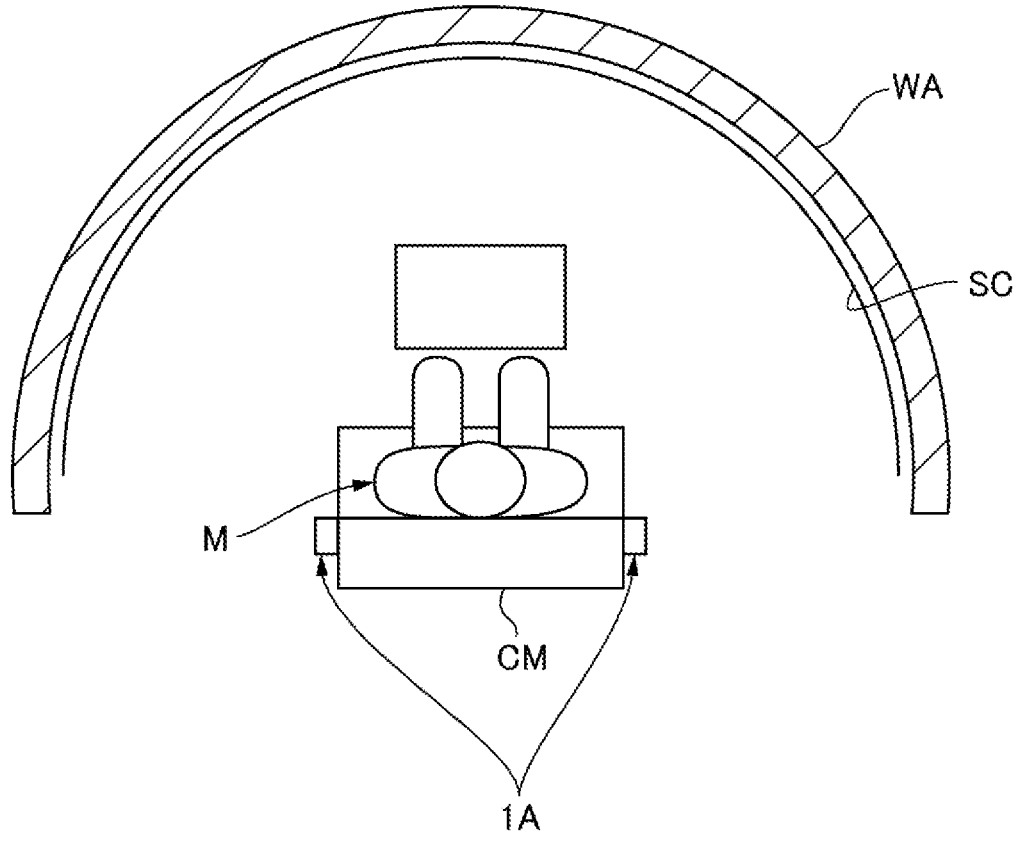
FIG. 7 is a schematic horizontal cross-sectional view of the projection system corresponding to FIG. 6.

As illustrated as an example in FIG. 6 and FIG. 7, the projection device 1A can be installed relative to a viewer M with a higher degree of freedom, and thus can be more easily installed. A plurality of the projection devices 1A can be easily installed on a seating portion CM of the viewer M and a ceiling CL. In this case, the viewer M can see the image on a wall WA serving as a screen SC. The seating portion CM may be a driver's seat of an automobile.

In the mobile device MD or the like, the camera CA can be used for detecting the position of the screen SC and sending a projection surface shape, so that the quality of the display image can be improved. The self-luminous display device can have a photodetector built therein to have the same function as the camera CA.

Second Embodiment

Figure 8:
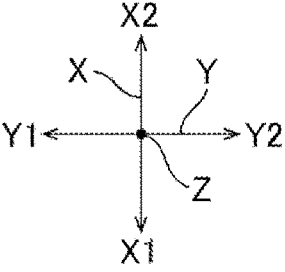
FIG. 8 is a diagram illustrating a projection device according to a second embodiment.

FIG. 8 is diagram illustrating a projection device according to a second embodiment. A projection device 1B according to the second embodiment is different from the projection device according to the first embodiment in the configurations of the first dichroic mirror 40 and the second dichroic mirror 50. The other components of the projection device 1B according to the second embodiment are the same as those in the projection device 1A according to the first embodiment. Thus, the corresponding components are denoted by the same reference numerals, and the description thereof will be omitted.

As illustrated in FIG. 8, in the image forming unit 2, the first dichroic mirror 40 and the second dichroic mirror 50 are disposed to cross each other. The self-luminous display devices surround the first dichroic mirror 40 and the second dichroic mirror 50 from three directions. The projection optical system 3 is located on the side opposite to the first self-luminous display device 11 with the first dichroic mirror 40 and the second dichroic mirror 50 interposed therebetween.

As illustrated in FIG. 8, the first dichroic mirror 40 includes the glass plate 41 and the first dichroic film 42 provided on the first surface 41a of the glass plate 41 facing the X2 direction. The first image light LG and the third image light LR transmit through the first dichroic mirror 40. The first dichroic mirror 40 reflects the second image light LB in the X2 direction. The first dichroic mirror 40 includes a first light absorption portion 43 that has a frame shape, and is disposed at an outer circumferential edge portion of the first surface 41a. The first light absorption portion 43 absorbs peripheral light of the first image light LG and peripheral light of the second image light LB. Note that the first light absorption portion 43 may absorb the first image light LG, the second image light LB, and the third image light LR.

The second dichroic mirror 50 includes the glass plate 51 and the second dichroic film 52 provided on the first surface 51a of the glass plate 51 facing the X2 direction. The first image light LG and the second image light LB transmit through the second dichroic mirror 50. The second dichroic mirror 50 reflects the third image light LR in the X2 direction. The second dichroic mirror 50 includes a second light absorption portion 53 that has a frame shape, and is disposed at an outer circumferential edge portion of the first surface 51a. The second light absorption portion 53 absorbs peripheral light of the first image light LG and peripheral light of the third image light LR. Note that the second light absorption portion 53 may absorb the first image light LG, the third image light LR, and the second image light LB.

According to the present embodiment, the respective image light beams emitted from the first self-luminous display device 11, the second self-luminous display device 12, and the third self-luminous display device 13 are superimposed by the first dichroic mirror 40 and the second dichroic mirror 50 and then the resultant image is incident on the projection optical system 3. No dichroic prism is used for superimposing the respective image light beams emitted from the three self-luminous display devices. Thus, production of stray light due to reflection in the prism can be prevented.

In the present embodiment, the first dichroic mirror 40 includes the first light absorption portion 43 that has a frame shape and is disposed at the outer circumferential edge portion. The first light absorption portion 43 absorbs peripheral light of the first image light LG and peripheral light of the second image light LB. The second dichroic mirror 50 includes the second light absorption portion 53 that has a frame shape, and is disposed at the outer circumferential edge portion. The second light absorption portion 53 absorbs peripheral light of the first image light LG and peripheral light of the third image light LR. This configuration can suppress failure of the peripheral light of the image light L emitted from the first dichroic mirror 40 and the second dichroic mirror 50 being incident on the projection optical system 3 to be stray light.

Third Embodiment

Figure 9:
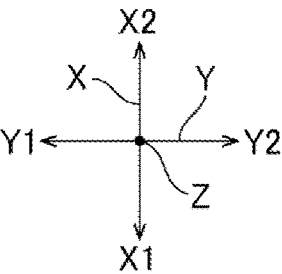
FIG. 9 is a diagram illustrating a projection device according to a third embodiment.

FIG. 9 is diagram illustrating a projection device 1C according to a third embodiment. The projection device 1C according to the third embodiment is different from the projection device 1A according to the first embodiment in that three spatial filters are provided. The other components of the projection device 1C according to the third embodiment are the same as those in the projection device 1A according to the first embodiment. Thus, the corresponding components are denoted by the same reference numerals, and the description thereof will be omitted.

As illustrated in FIG. 9, in the image forming unit 2, the first dichroic mirror 40 and the second dichroic mirror 50 are disposed to cross each other. The first self-luminous display device 11, the second self-luminous display device 12, and the third self-luminous display device 13 surround the first dichroic mirror 40 and the second dichroic mirror 50 from three directions. The projection optical system 3 is located on the side opposite to the first self-luminous display device 11 with the first dichroic mirror 40 and the second dichroic mirror 50 interposed therebetween.

In the present embodiment, the image forming unit 2 includes a first spatial filter 61 disposed between the first self-luminous display device 11 and the first dichroic mirror 40. The image forming unit 2 includes a second spatial filter 62 disposed between the second self-luminous display device 12 and the first dichroic mirror 40. The image forming unit 2 includes a third spatial filter 63 disposed between the third self-luminous display device 13 and the second dichroic mirror 50.

The first spatial filter 61 includes a glass plate 65, a first light absorption portion 66G that has a frame shape and is provided at the outer circumferential edge portion of the glass plate 65, and a first transmission portion 67G that is a portion of the glass plate 65 on the inner circumference side of the first light absorption portion 66G. The first light absorption portion 66G absorbs peripheral light of the first image light LG. The first image light LG transmits through the first transmission portion 67G. The second spatial filter 62 includes the glass plate 65, a second light absorption portion 66B that has a frame shape and is provided at the outer circumferential edge portion of the glass plate 65, and a second transmission portion 67B that is a portion of the glass plate 65 on the inner circumference side of the second light absorption portion 66B. The second light absorption portion 66B absorbs peripheral light of the second image light LB. The second image light LB transmits through the second transmission portion 67B. The third spatial filter 63 includes the glass plate 65, a third light absorption portion 66R that has a frame shape and is provided at the outer circumferential edge portion of the glass plate 65, and a third transmission portion 67R that is a portion of the glass plate 65 on the inner circumference side of the third light absorption portion 66R. The third light absorption portion 66R absorbs peripheral light of the third image light LR. The third image light LR transmits through the third transmission portion 67R.

In the present embodiment, the first spatial filter 61, the second spatial filter 62, and the third spatial filter 63 are the same member. Thus, the first light absorption portion 66G of the first spatial filter 61, the second light absorption portion 66B of the second spatial filter 62, and the third light absorption portion 66R of the third spatial filter 63 each absorb the first image light LG, the second image light LB, and the third image light LR. The first image light LG, the second image light LB, and the third image light LR transmit through any of the first transmission portion 67G of the first spatial filter 61, the second transmission portion 67B of the second spatial filter 62, and the third transmission portion 67R of the third spatial filter 63.

According to the present embodiment, the respective image light beams emitted from the first self-luminous display device 11, the second self-luminous display device 12, and the third self-luminous display device 13 are superimposed by the first dichroic mirror 40 and the second dichroic mirror 50 and then the resultant image is incident on the projection optical system 3. No dichroic prism is used for superimposing the respective image light beams emitted from the three self-luminous display devices. Thus, production of stray light due to reflection in the prism can be prevented.

The projection device 1C according to the present embodiment includes the first spatial filter 61 disposed between the first self-luminous display device 11 and the first dichroic mirror 40, the second spatial filter 62 disposed between the second self-luminous display device 12 and the first dichroic mirror 40, and the third spatial filter 63 disposed between the third self-luminous display device 13 and the second dichroic mirror 50. The first spatial filter 61 includes the first light absorption portion 66G that has a frame shape and absorbs peripheral light of the first image light LG, and the first transmission portion 67G through which the first image light LG transmits. The second spatial filter 62 includes the second light absorption portion 66B that has a frame shape and absorbs peripheral light of the second image light LB, and the second transmission portion 67B through which the second image light LB transmits. The third spatial filter 63 includes the third light absorption portion 66R that has a frame shape and absorbs peripheral light of the third image light LR, and the third transmission portion 67R through which the third image light LR transmits. Thus, failure of the peripheral light of the image light L being incident on the projection optical system 3 to be the stray light can be suppressed.

As in the second embodiment, the first dichroic mirror 40 may include the first light absorption portion 43 that has a frame shape and absorbs peripheral light of the first image light LG and peripheral light of the second image light LB. As in the second embodiment, the second dichroic mirror 50 may include the second light absorption portion 53 that has a frame shape and absorbs peripheral light of the first image light LG and peripheral light of the third image light LR. This configuration can further suppress failure of the peripheral light of the image light L being incident on the projection optical system 3 to be the stray light.

Fourth Embodiment

Figure 10:
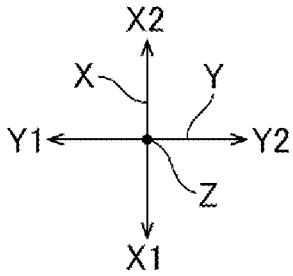
FIG. 10 is a diagram illustrating a projection device according to a fourth embodiment.
Figure 11:
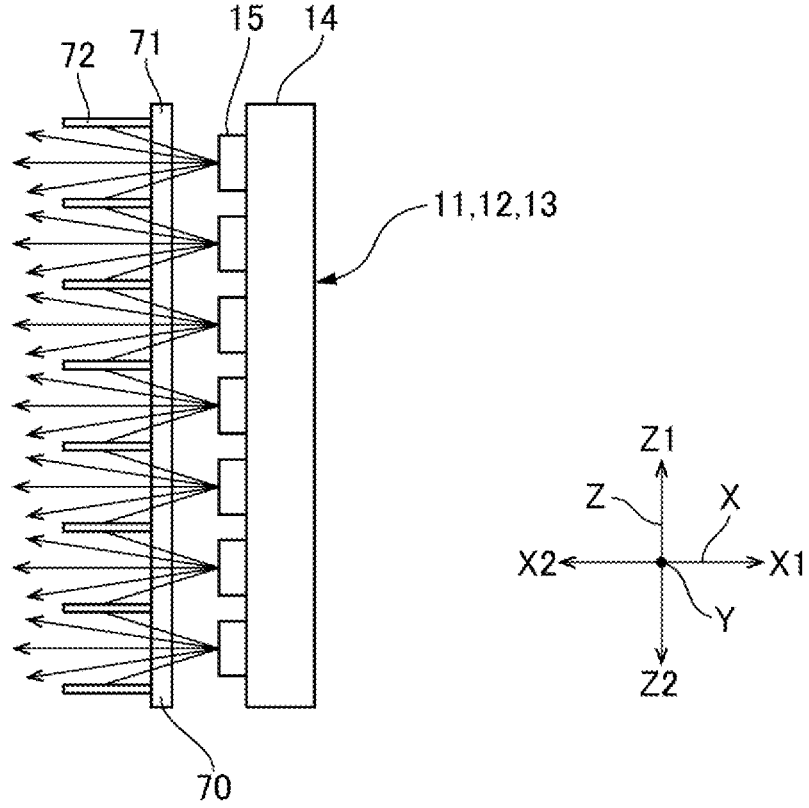
FIG. 11 is a diagram illustrating an angle limiting filter.

FIG. 10 is diagram illustrating a projection device 1D according to a fourth embodiment. FIG. 11 is a diagram illustrating an angle limiting filter. The projection device 1D according to the fourth embodiment is different from the projection device 1A according to the first embodiment, in that three angle limiting filters are provided. The other components of the projection device 1D according to the fourth embodiment are the same as those in the projection device 1A according to the first embodiment. Thus, the corresponding components are denoted by the same reference numerals, and the description thereof will be omitted.

As illustrated in FIG. 10, in the image forming unit 2, the first dichroic mirror 40 and the second dichroic mirror 50 are disposed to cross each other. The first self-luminous display device 11, the second self-luminous display device 12, and the third self-luminous display device 13 surround the first dichroic mirror 40 and the second dichroic mirror 50 from three directions. The projection optical system 3 is located on the side opposite to the first self-luminous display device 11 with the first dichroic mirror 40 and the second dichroic mirror 50 interposed therebetween.

In the present embodiment, in the image forming unit 2, one angle limiting filter 70 is disposed between the first self-luminous display device 11 and the first dichroic mirror 40, between the second self-luminous display device 12 and the first dichroic mirror 40, and between the third self-luminous display device 13 and the second dichroic mirror 50.

For example, as illustrated in FIG. 11, the angle limiting filter 70 includes a glass plate 71 and a grating structure 72 made of resin and provided on one surface of the glass plate 71. The grating structure 72 is provided in front of each of the light-emitting elements 15 of the self-luminous display device to make the light distribution angle of the image light emitted from each of the light-emitting elements 15 small. Thus, the light distribution angle of the first image light LG of the first self-luminous display device 11 is small. The light distribution angle of the second image light LB of the second self-luminous display device 12 is small. The light distribution angle of the third image light LR of the third self-luminous display device 13 is small.

According to the present embodiment, the respective image light beams emitted from the first self-luminous display device 11, the second self-luminous display device 12, and the third self-luminous display device 13 are superimposed by the first dichroic mirror 40 and the second dichroic mirror 50 and then the resultant image is incident on the projection optical system 3. No dichroic prism is used for superimposing the respective image light beams emitted from the three self-luminous display devices. Thus, production of stray light due to reflection in the prism can be prevented.

In the present embodiment, with the three angle limiting filters 70, the light distribution angles of the first image light LG of the first self-luminous display device 11, the second image light LB of the second self-luminous display device 12, and the third image light LR of the third self-luminous display device 13 are made small. Thus, failure of the peripheral light of the first image light LG, the second image light LB, and the third image light LR being incident on the projection optical system 3 to be the stray light can be suppressed.

Also in the present embodiment, as in the second embodiment, the first dichroic mirror 40 may include the first light absorption portion 43 that has a frame shape and absorbs peripheral light of the first image light LG and peripheral light of the second image light LB. As in the second embodiment, the second dichroic mirror 50 may include the second light absorption portion 53 that has a frame shape and absorbs peripheral light of the first image light LG and peripheral light of the third image light LR. This configuration can further suppress failure of the peripheral light of the image light L being incident on the projection optical system 3 to be the stray light.

Also in the present embodiment, the three spatial filters may be provided as in the third embodiment. In addition to the three spatial filters, the first dichroic mirror 40 may include the first light absorption portion 43 and the second dichroic mirror 50 may include the second light absorption portion 53.

Figure 12:
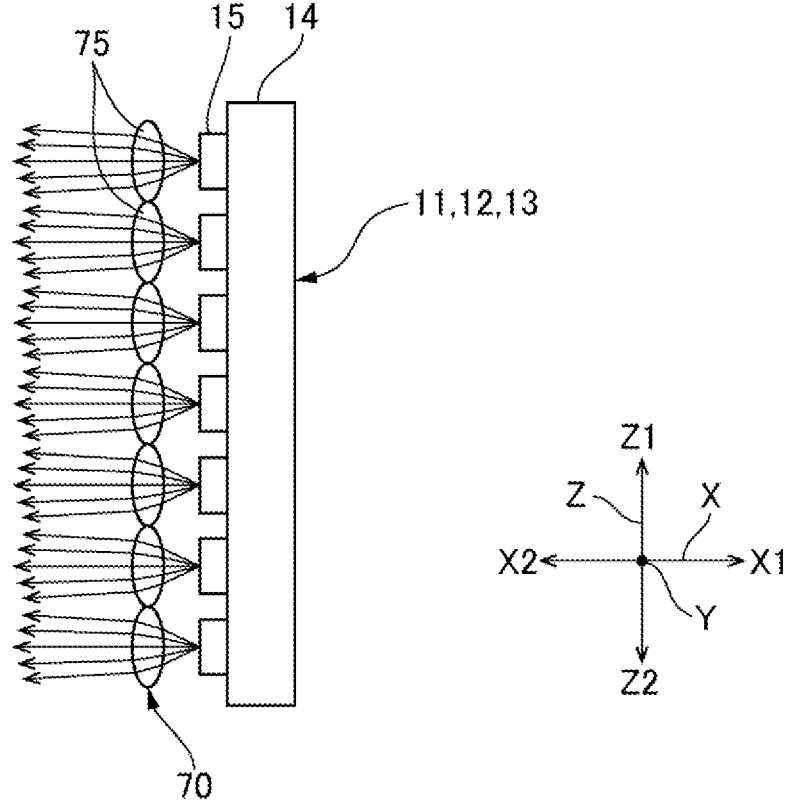
FIG. 12 is a diagram illustrating another example of the angle limiting filter.

FIG. 12 illustrates another example of the angle limiting filter 70. As illustrated in FIG. 12, the angle limiting filter 70 of the present example includes a plurality of lenses 75 arranged in a matrix. The plurality of lenses 75 refract the image light emitted from the light-emitting elements 15 of the self-luminous display devices, to make the light distribution angle of the image light small.

First Modification

Figure 13:
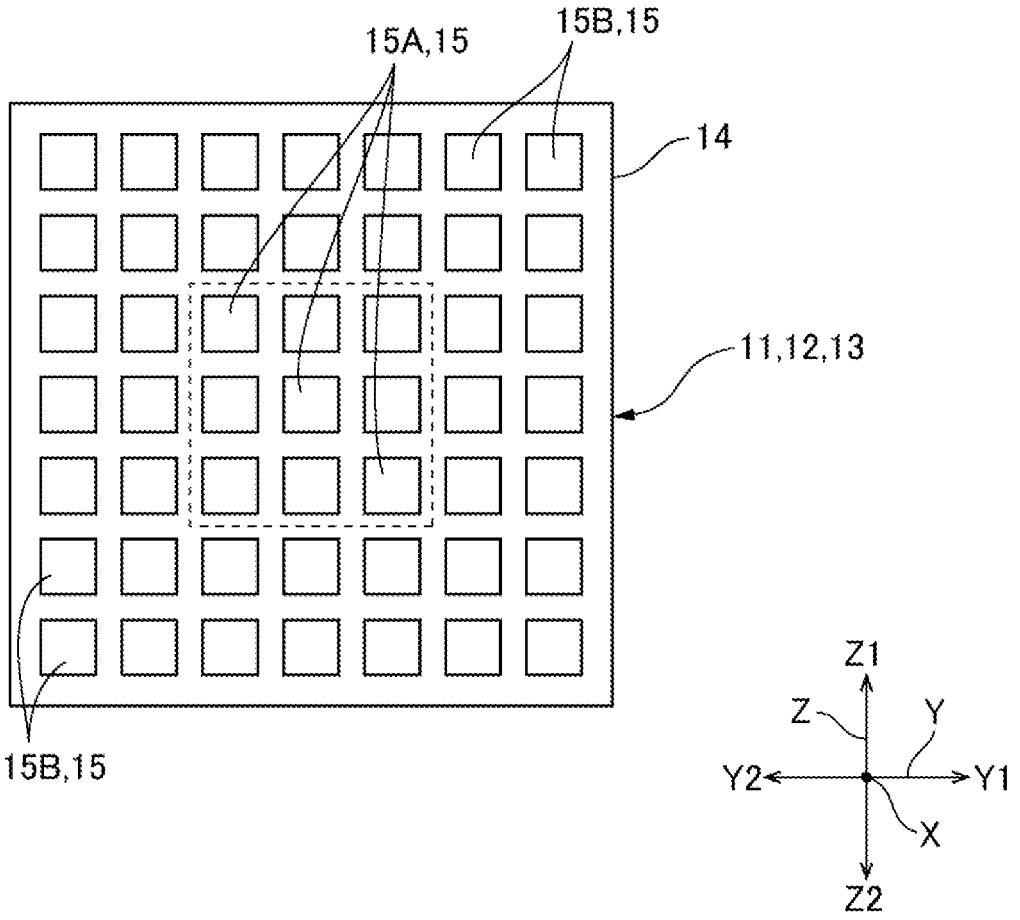
FIG. 13 is a front view of a self-luminous display device having an in-plane angular distribution.
Figure 14:
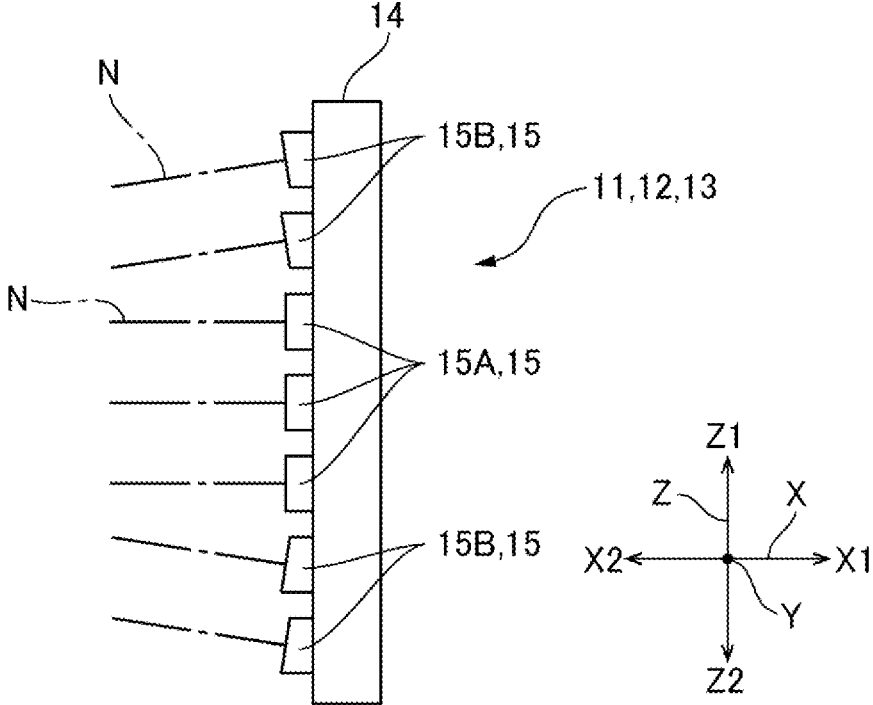
FIG. 14 is a side view of a self-luminous display device having an in-plane angular distribution.

In the second embodiment in which each dichroic mirror includes the light absorption portion and in the third embodiment in which the spatial filter is provided, the first self-luminous display device, the second self-luminous display device, and the third self-luminous display device may have an in-plane angular distribution. FIG. 13 is a front view of a self-luminous display device having an in-plane angular distribution. FIG. 14 is a diagram illustrating self-luminous display device having an in-plane angular distribution.

As illustrated in FIGS. 13 and 14, each of the self-luminous display devices includes the substrate 14 and the plurality of light-emitting elements 15 arranged in a matrix on the substrate 14. The optical axes N of a plurality of inner side light-emitting elements 15A, of the plurality of light-emitting elements 15, arranged in a matrix in a center portion are perpendicular to the substrate. The optical axes N of a plurality of outer circumference side light-emitting elements 15B, of the plurality of light-emitting elements 15, arranged in a frame shape on the outer circumference side of the plurality of inner side light-emitting elements 15A are inclined toward the inner circumference side.

In the second embodiment, when the self-luminous display device having the in-plane angular distribution is used for each of the first self-luminous display device 11, the second self-luminous display device 12, and the third self-luminous display device 13, the amount of the peripheral light of the image light of each of the self-luminous display devices absorbed by the light absorption portion can be reduced. Thus, a difference in light amount between the peripheral portion and the center portion of the image light L can be reduced. In the third embodiment, when each of the first self-luminous display device 11, the second self-luminous display device 12, and the third self-luminous display device 13 has the in-plane angular distribution, the amount of the peripheral light of the image light of each of the self-luminous display devices absorbed by the spatial filter can be reduced. Thus, a difference in light amount between the peripheral portion and the center portion of the image light L can be reduced.

Second Modification

Figure 15:
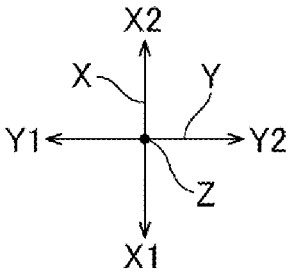
FIG. 15 is a schematic view of a projection device in which a self-luminous display device has a light emission intensity distribution.
Figure 16:
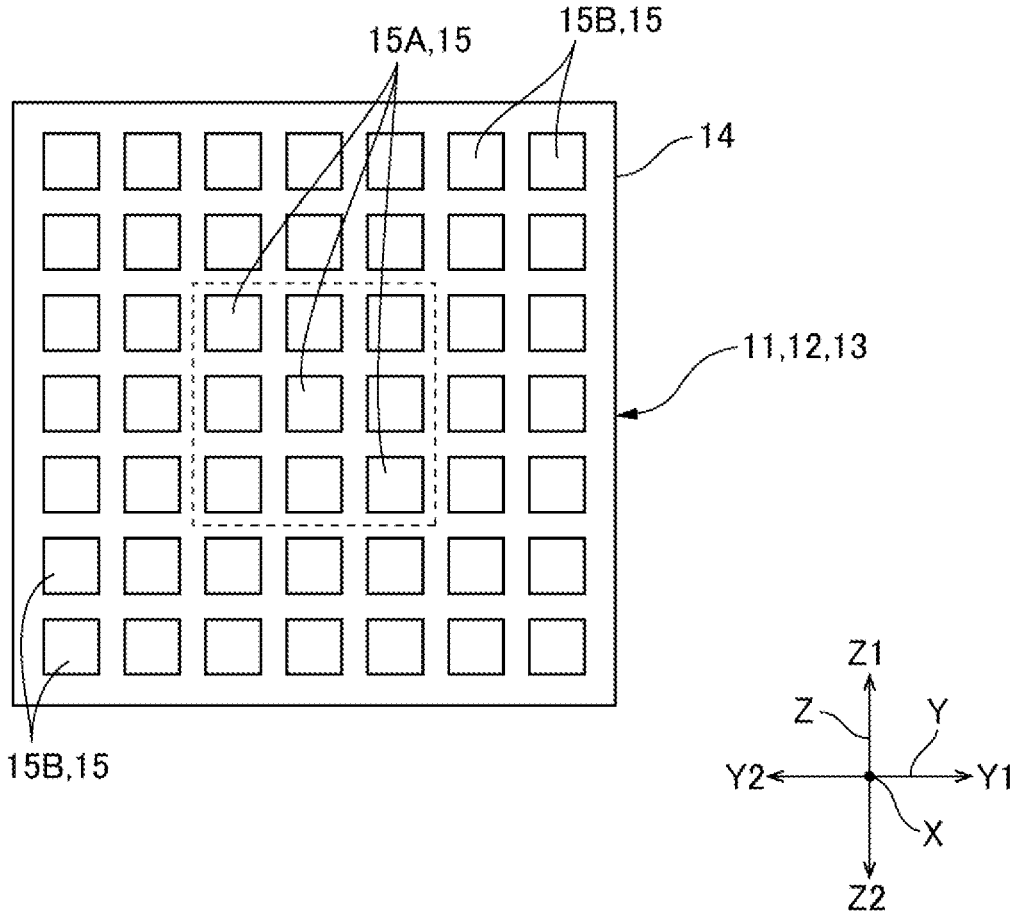
FIG. 16 is a diagram illustrating the self-luminous display device having the light emission intensity distribution.

In the second embodiment in which each dichroic mirror includes the light absorption portion and in the third embodiment in which the spatial filter is provided, the first self-luminous display device 11, the second self-luminous display device 12, and the third self-luminous display device 13 may have a light emission intensity distribution. FIG. 15 is a schematic view of a projection device in which a self-luminous display device has a light emission intensity distribution. FIG. 16 is a diagram illustrating the self-luminous display device having the light emission intensity distribution.

As illustrated in FIG. 15, in a projection device 1E of the present example, the display drive unit 7 of the control unit 4 includes a light emission intensity control unit. The light emission intensity control unit makes the light emission intensity of the plurality of outer circumference side light-emitting elements 15B, of the plurality of light-emitting elements 15, arranged in a frame shape on the outer circumference side higher than that of the plurality of inner side light-emitting elements 15A arranged on the inner side of the outer circumference side light-emitting elements 15B, in each of the self-luminous display devices as illustrated in FIG. 16. As a result, the amount of peripheral light is large in the image light from each of the self-luminous display devices.

Thus, when the first self-luminous display device 11, the second self-luminous display device 12, and the third self-luminous display device 13 each include the light emission intensity distribution in the second embodiment, a difference in the light amount between the peripheral portion and the center portion of the image light L can be reduced when the peripheral light of the image light of each of the self-luminous display devices is partially absorbed by the light absorption portion. Furthermore, when the first self-luminous display device 11, the second self-luminous display device 12, and the third self-luminous display device 13 each include the light emission intensity distribution in the third embodiment, a difference in the light amount between the peripheral portion and the center portion of the image light L can be reduced when the peripheral light of the image light of each of the self-luminous display devices is partially absorbed by the spatial filter.

OTHER EMBODIMENTS

Figure 17:
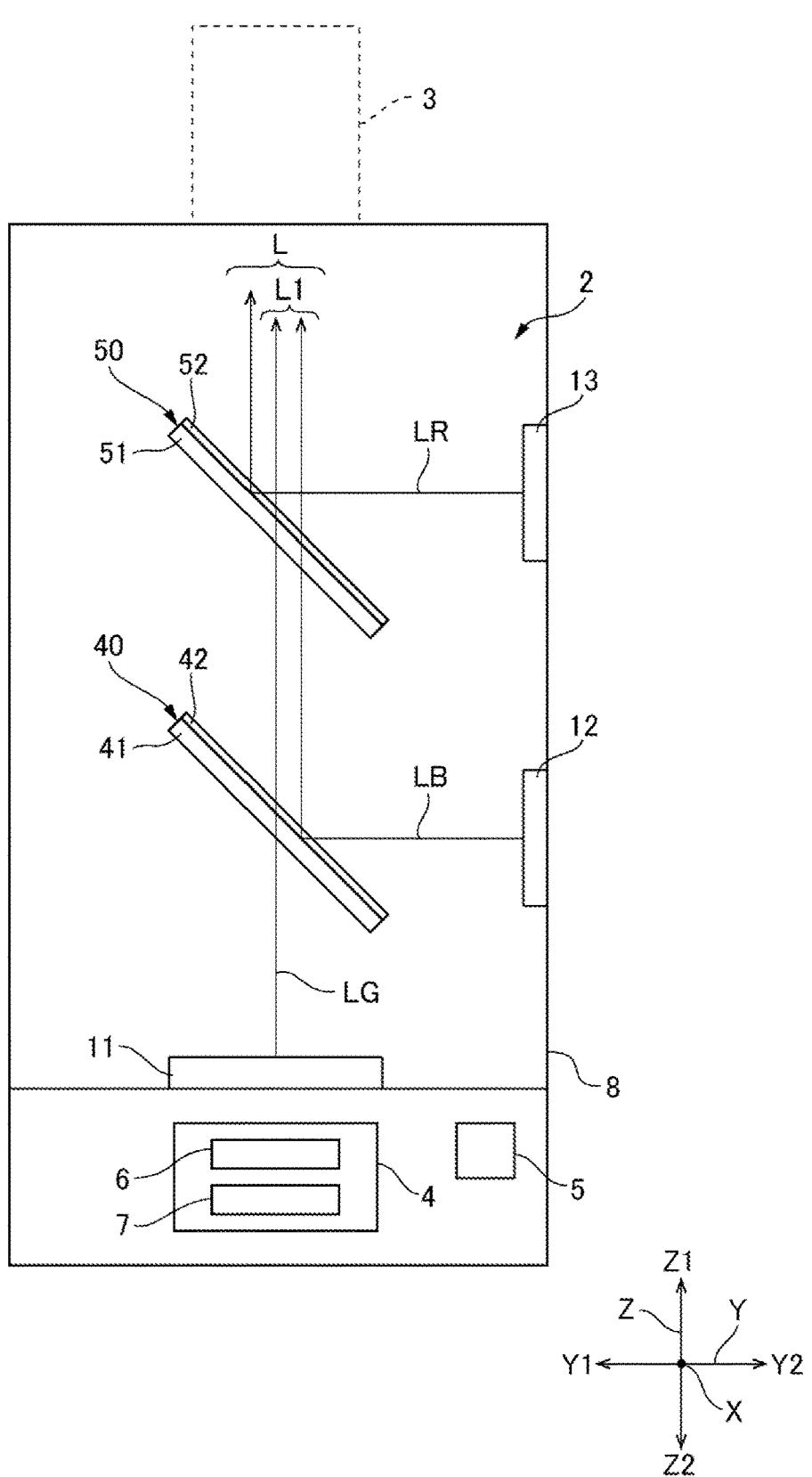
FIG. 17 is a diagram illustrating a first arrangement example in which a first dichroic mirror and a second dichroic mirror are separated from each other in an X-axis direction.
Figure 18:
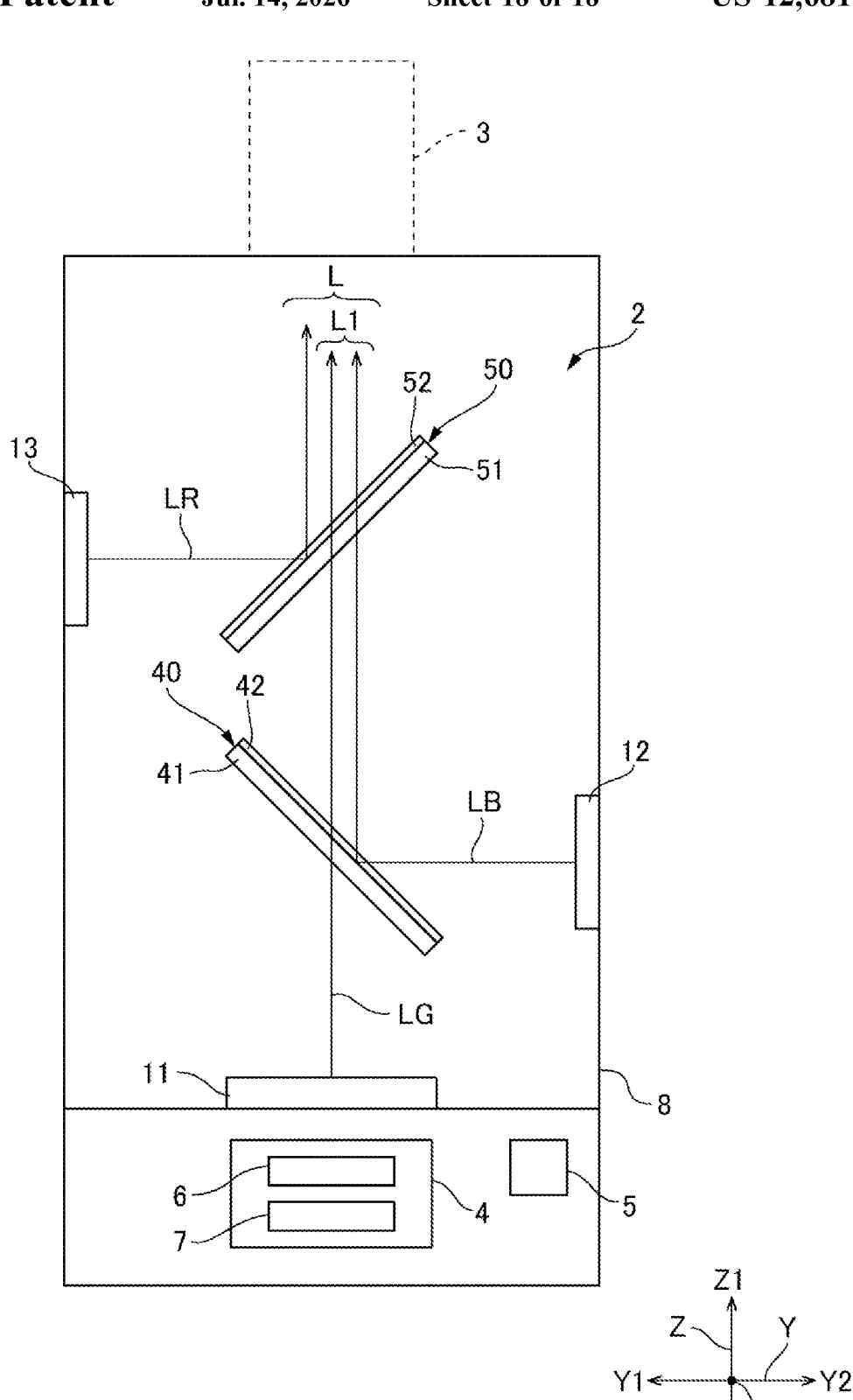
FIG. 18 is a diagram illustrating a second arrangement example in which the first dichroic mirror and the second dichroic mirror are separated from each other in the X-axis direction.

In each of the embodiments and the modifications, the arrangement of the first self-luminous display device 11, the second self-luminous display device 12, the third self-luminous display device 13, the first dichroic mirror 40, and the second dichroic mirror 50 may be changed in the image forming unit 2. FIG. 17 is a diagram illustrating a first arrangement example where the first dichroic mirror 40 and the second dichroic mirror 50 are separated from each other in the X-axis direction. FIG. 18 is a diagram illustrating a second arrangement example where the first dichroic mirror 40 and the second dichroic mirror 50 are separated from each other in the X-axis direction.

In the first arrangement example illustrated in FIG. 17, the first self-luminous display device 11, the first dichroic mirror 40, and the second dichroic mirror 50 are arranged in this order in the X-axis direction. The first dichroic mirror 40 and the second dichroic mirror 50 are inclined in the same direction. Specifically, the first dichroic mirror 40 and the second dichroic mirror 50 are both inclined in the Y1 direction toward the X2 direction. The second self-luminous display device 12 is positioned in the Y2 direction with respect to the first dichroic mirror 40. The third self-luminous display device 13 is positioned in the Y2 direction with respect to the first dichroic mirror 40.

The first self-luminous display device 11 emits the first image light LG toward the first dichroic mirror 40 and the second dichroic mirror 50. The second self-luminous display device 12 emits the second image light LB toward the first dichroic mirror 40. The third self-luminous display device 13 emits the third image light LR toward the second dichroic mirror 50. The first dichroic mirror 40 emits first combined light L1 that is a combination of the first image light LG and the second image light LB respectively transmitting through the first image light LG and reflected by the second image light LB. The first combined light L1 and the third image light LR respectively transmits through and is reflected by the second dichroic mirror 50. The first combined light L1 and the third image light LR are superimposed. The second dichroic mirror 50 outputs the image light L in the X2 direction.

In the second arrangement example illustrated in FIG. 18, the first self-luminous display device 11, the first dichroic mirror 40, and the second dichroic mirror 50 are arranged in this order in the X-axis direction. The first dichroic mirror 40 and the second dichroic mirror 50 are inclined in different directions. Thus, the first dichroic mirror 40 is inclined in the Y1 direction toward the X2 direction. The second dichroic mirror 50 is inclined in the Y2 direction toward the X2 direction. The second self-luminous display device 12 is positioned in the Y2 direction with respect to the first dichroic mirror 40. The third self-luminous display device 13 is positioned in the Y1 direction with respect to the second dichroic mirror 50.

The first self-luminous display device 11 emits the first image light LG toward the first dichroic mirror 40 and the second dichroic mirror 50. The second self-luminous display device 12 emits the second image light LB toward the first dichroic mirror 40. The third self-luminous display device 13 emits the third image light LR toward the second dichroic mirror 50. The first dichroic mirror 40 emits first combined light L1 that is a combination of the first image light LG and the second image light LB respectively transmitting through the first image light LG and reflected by the second image light LB. The first combined light L1 and the third image light LR respectively transmits through and is reflected by the second dichroic mirror 50. The first combined light L1 and the third image light LR are superimposed. The second dichroic mirror 50 outputs the image light L in the X2 direction.

When the first arrangement example and the second arrangement example are employed, the first dichroic mirror 40 and the second dichroic mirror 50 can be easily installed compared with in a configuration in which the first dichroic mirror 40 and the second dichroic mirror 50 cross each other.

What is claimed is:

1. A projection device comprising:
a first dichroic mirror configured to transmit light of a first wavelength and reflect light of a second wavelength;
a second dichroic mirror configured to transmit the light of the first wavelength and reflect light of a third wavelength;
a first self-luminous display device including a plurality of first light-emitting elements configured to emit the light of the first wavelength, the first self-luminous display device being configured to use the light of the first wavelength to emit first image light toward the first dichroic mirror and the second dichroic mirror;
a second self-luminous display device including a plurality of second light-emitting elements configured to emit the light of the second wavelength, the second self-luminous display device being configured to use the light of the second wavelength to emit second image light toward the first dichroic mirror;
a third self-luminous display device including a plurality of third light-emitting elements configured to emit the light of the third wavelength, the third self-luminous display device being configured to use the light of the third wavelength to emit third image light toward the second dichroic mirror; and
a projection optical system configured to project, onto a projection target, image light obtained by being combined by the first dichroic mirror and the second dichroic mirror, wherein
the first dichroic mirror includes;
a first glass plate having a first surface facing the projection optical system; and
a first light absorption portion disposed directly on an outer circumferential edge portion of the first surface, having a frame shape and configured to absorb peripheral light of the first image light and peripheral light of the second image light, and the second dichroic mirror includes;

a second glass plate having a second surface facing the projection optical system; and a second light absorption portion disposed directly on an outer circumferential edge portion of the second surface, having a frame shape and configured to absorb peripheral light of the first image light and peripheral light of the third image light.

2. The projection device according to claim 1, further comprising a power source unit configured to supply power to the first self-luminous display device, the second self-luminous display device, and the third self-luminous display device.

3. The projection device according to claim 1, wherein the first dichroic mirror and the second dichroic mirror cross each other.

4. The projection device according to claim 1, wherein the first dichroic mirror and the second dichroic mirror are disposed at positions separated from each other.

5. The projection device according to claim 1, wherein each of the first self-luminous display device, the second self-luminous display device, and the third self-luminous display device includes a plurality of light-emitting elements arranged in a matrix, and optical axes of a plurality of outer circumference side light-emitting elements, of the plurality of light-emitting elements, arranged in a frame shape on an outer circumference side are inclined toward an inner circumference side.

6. The projection device according to claim 1, further comprising a control unit configured to control the first self-luminous display device, the second self-luminous display device, and the third self-luminous display device, wherein the control unit controls light emission intensity of each of the plurality of light-emitting elements in each of the first self-luminous display device, the second self-luminous display device, and the third self-luminous display device, and light emission intensity of a plurality of outer circumference side light-emitting elements, of the plurality of light-emitting elements, arranged in a frame shape on an outer circumference side is greater than light emission intensity of a plurality of inner side light-emitting elements, of the plurality of light-emitting elements, arranged on an inner side of the plurality of outer circumference side light-emitting elements.

7. The projection device according to claim 1, comprising a plurality of angle limiting filters respectively disposed between the first self-luminous display device and the first dichroic mirror, between the second self-luminous display device and the first dichroic mirror, and between the third self-luminous display device and the second dichroic mirror, wherein each of the first self-luminous display device, the second self-luminous display device, and the third self-luminous display device includes a plurality of light-emitting elements arranged in a matrix, and the plurality of angle limiting filters reduce a light distribution angle of the image light emitted from each of the plurality of light-emitting elements.

* * * * *